Dec. 7, 1937.  N. C. HUNT ET AL  2,101,025
PRESSURE VALVE
Filed Dec. 28, 1936   3 Sheets-Sheet 1

Inventors
Nathan C. Hunt
Samuel C. Chessman
By Pease and Bishop
Attorneys

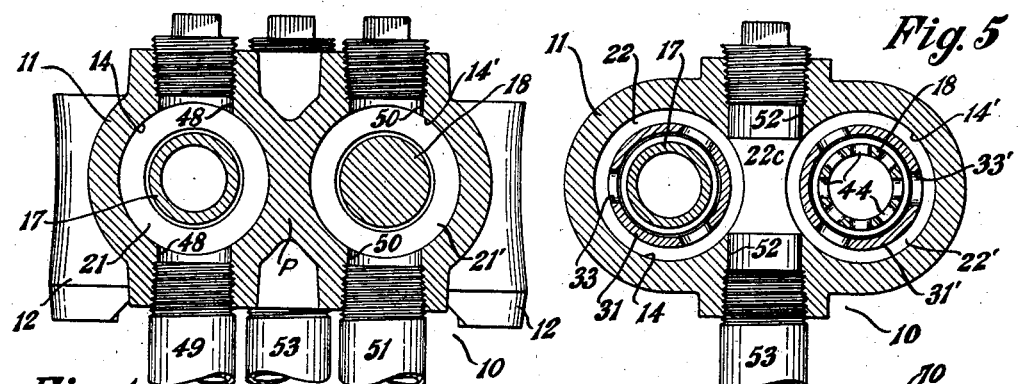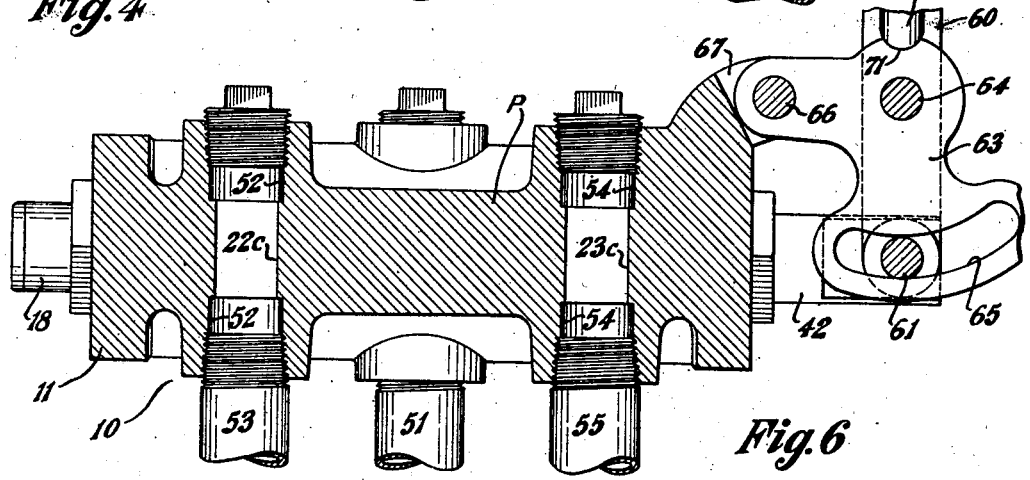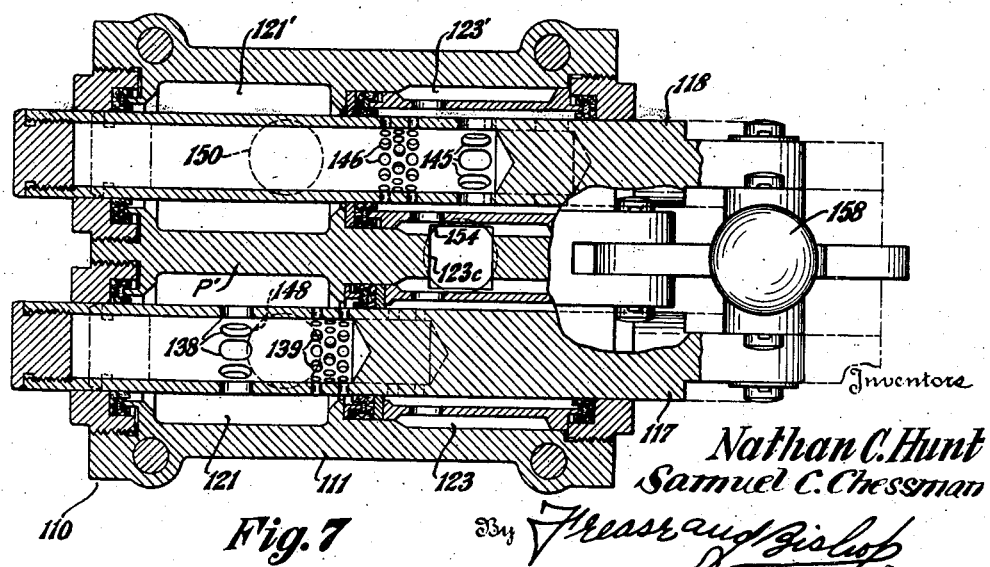

Dec. 7, 1937.    N. C. HUNT ET AL    2,101,025
PRESSURE VALVE
Filed Dec. 28, 1936    3 Sheets—Sheet 3

Inventors
Nathan C. Hunt
Samuel C. Chessman
By
Attorneys

Patented Dec. 7, 1937

2,101,025

UNITED STATES PATENT OFFICE 2,101,025

PRESSURE VALVE

Nathan C. Hunt and Samuel C. Chessman, Salem, Ohio; said Chessman assignor to said Hunt Application December 28, 1936, Serial No. 117,808

13 Claims. (Cl. 277—12)

The invention relates to valves for pressure lines utilized in transmitting fluids under pressure, and more particularly to hydraulic valves for pressure lines used in connection with the operation of machinery and the like.

Such valves may be used in connection with pressure lines for operating tools, various types of testing apparatus, factory and industrial equipment including hydraulic presses, rolling mill machinery, and the like.

Prior valves of different types have been constructed for these various purposes, but many difficulties arise in connection with the manufacture, operation and use of these prior types of valves.

For example, valves of the cock type have been used, but cock type valves usually require an accurate fit between a tapered valve and valve seat, and function only a short time before leakage occurs in the line in the valve.

Moreover, where it is required to control a three way or four way pressure flow system including providing for holding the pressure in one or more lines and for exhausting the pressure from one or more lines back into the system, with prior types a complicated valve has been necessary, or several valves have been employed.

Accordingly, it is a general object of the present invention to provide a hydraulic valve for pressure lines which will overcome the difficulties and solve the problems present in prior valves, and which valve is balanced in all positions.

Another object is to provide an improved valve for a pressure line which is constructed to function with a minimum of leakage and to prevent wear on the ports and packings over long periods of time.

Another object is to provide an improved valve for use in three way and four way pressure systems, and readily adapted to meet requirements for holding and exhausting pressure in different pressure lines.

A further object is to provide an improved valve attaining all of the foregoing objects, which valve is simple and inexpensively made, and which may be quickly and easily disassembled for inspection or repair.

These and other objects are attained by the valve construction comprising the present invention, preferred embodiments of which are shown in the drawings and hereinafter described in detail and claimed, and which may be stated in general terms as including a tubular valve housing having two hollow plunger members slidably mounted therein and operable in unison, spaced annular inlet, outlet and exhaust channels surrounding each of the plungers and pressure sealed packing means in said channels, ports in said plungers for providing communication through said plungers between said spaced channels, cross passages providing communication between certain opposite channels, and passages in said valve housing for providing pressure line connection with said channels.

Referring to the drawings forming part thereof,

Fig. 4 is a cross sectional view as on line 4—4, Fig. 2;

Fig. 5 is a cross sectional view substantially as on line 5—5, Fig. 2;

Fig. 6 is a longitudinal sectional view as on line 6—6, Fig. 2;

Fig. 7 is a longitudinal sectional view of a preferred embodiment of three way valve, showing the valve in neutral holding position;

Similar numerals refer to similar parts throughout the drawings.

Figure 2:
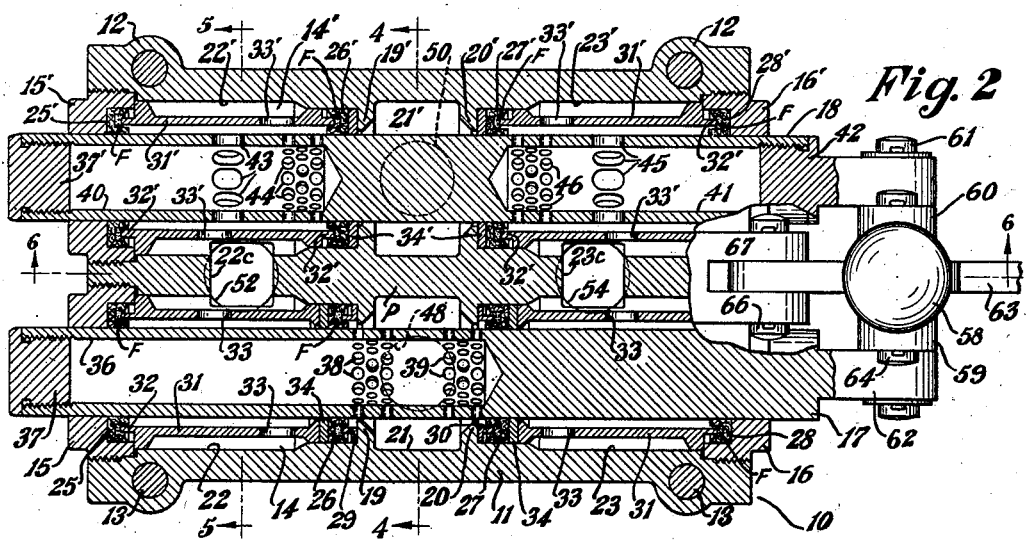
Fig. 2 is a longitudinal sectional view thereof in neutral holding position.

Referring first to Figs. 1 to 6, inclusive, a four way valve constructed according to the present invention is indicated generally at 10, and includes a tubular valve housing 11 having spaced bosses 12 at opposite sides for receiving bolts or screws 13 for mounting the valve on a suitable support.

The valve housing or sleeve member 11 is provided with two identical tubular bores 14 and 14' located side by side and extending through the valve housing from end to end forming a partition wall P. Annular cap or closure members 15 and 16 are screwed one in each end of bore 14, and similar closure members 15' and 16' are screwed one in each end of bore 14'. A cylindrical plunger member 17 is slidably journalled in closure members 15 and 16 for longitudinal movement in bore 14, and a cylindrical plunger member 18 is slidably journalled in closure members 15' and 16' for longitudinal movement in bore 14'.

Preferably, at the central portion longitudinally of bore 14, the valve housing has formed therein spaced annular ribs 19 and 20 projecting radially inward to form an annular channel 21 surrounding the plunger member 17, which may be termed an inlet channel. Between rib 19 and closure member 15 is formed an annular outlet channel 22 surrounding plunger member 17, which may be termed an inlet-to-outlet channel, and between rib 20 and closure member 16 is formed a similar annular outlet channel 23, which may also be termed an inlet-to-outlet channel.

Similarly, at the central portion longitudinally of bore 14' the valve housing has formed therein spaced annular ribs 19' and 20' projecting radially inward to form an annular channel 21' surrounding the plunger member 18, which may be termed an exhaust channel. Between rib 19' and closure member 15' is formed an annular outlet channel 22' surrounding the plunger member 18, which may be termed an outlet-to-exhaust channel, and between rib 20' and closure member 16' is formed a similar annular outlet channel 23' which may also be termed an outlet-to-exhaust channel.

A cross passage 22c is formed in the partition wall P for providing communication between opposite channels 22 and 22', and a cross passage 23c is formed in partition wall P for providing communication between opposite channels 23 and 23'.

Two flexible channel-shaped or U-shaped packing rings are located in each of the annular channels 22 and 23, for fitting around the plunger 17, and two flexible channel-shaped or U-shaped packing rings are located in each of the annular channels 22' and 23' for fitting around the plunger 18.

The packing ring 25 in channel 22 is seated in an interior annular groove formed in closure 15, and the packing ring 26 in channel 22 is located adjacent annular rib 19. The packing ring 27 is located adjacent the annular rib 20 in channel 23, and the packing ring 28 in channel 23 is seated in an interior annular groove formed in closure 16. The packing rings 26 and 27 have their open sides directed toward inlet channel 21 for a purpose to be described.

Similarly, the packing ring 25' in channel 22' is seated in an interior annular groove formed in closure 15', and the packing ring 26' is located in channel 22' adjacent annular rib 19'. The packing ring 27' is located in channel 23' adjacent rib 20' and the packing ring 28' in channel 23' is seated in an interior annular groove formed in closure 16'. The packing rings 26' and 27' have their open sides directed away from exhaust channel 21' for a purpose to be described.

Preferably, an annular flange 29, secured to or integral with rib 19, extends between the lips of packing ring 26 for aiding in maintaining said lips in spread apart position, and a similar flange 30 extends from rib 20 between the legs of packing ring 27. A rigid tubular spacer member 31 is interposed between packings 25 and 26, one end of said spacer being provided with a flange 32 for extending between the lips of packing ring 25. A similar rigid tubular spacer member 31 is interposed between packings 27 and 28, one end of said spacer being provided with a flange 32 for extending between the lips of packing ring 28.

The walls of the tubular spacer members 31 are provided with a plurality of openings or perforations indicated at 33.

Similarly, rigid tubular spacer member 31' having perforations 33' are interposed one between packings 25' and 26', and one between packings 27' and 28', both ends of each spacer 31' having a flange 32' for extending between the lips of the packing rings.

Wearing rings 34, preferably of hardened steel, are interposed between the closed sides of packing rings 26 and 27 and the adjacent ends of spacers 31, said rings being closely journalled on plunger member 17, for a purpose to be described. Similarly, wearing rings 34' are interposed between the closed sides of packing rings 26' and 27' and the ribs 19' and 20' respectively, and closely journalled on plunger member 18.

Flax packings F having a great capacity for absorbing liquid are preferably located between the lips of each packing ring for being abutted by the spacer flanges 32, 29 and 30, and by the spacer flanges 32', so as to uniformly maintain the lips of the packing rings in sealing position between the valve body and the plunger members. The flax packings together with the spacers serve to maintain the packing rings in longitudinal adjustment.

The plunger member 17 is hollow or bored out from one end, as shown at 36, the outer end of the bore being closed by a plug 37 screwed therein. The inner end of the bore 36 is provided with a series of circumferential rows of ports indicated at 38, and a series of circumferential rows of ports 39 longitudinally spaced therefrom; and in the neutral holding position of the valve shown in Fig. 2, both series of ports 38 and 39 are located so as to register or communicate with inlet channel 21 and so as to be positioned between packings 26 and 27.

The plunger member 18 is hollow or bored out from both ends as indicated at 40 and 41, and the open or outer end of bore 40 is closed by a plug 37' screwed therein, while the outer end of bore 41 is closed by a plug member 42. At the inner end of bore 40 the plunger 18 is provided with preferably a circumferential row of ports 43 and a series of circumferential rows of ports 44 longitudinally spaced therefrom; and at the inner end of bore 41 the plunger 18 is provided with longitudinally spaced circumferential rows of ports 45 and 46. The ports 43 and 44 are located so as to both register or communicate with outlet-to-exhaust channel 22', with the valve in neutral position as shown in Fig. 2, and the ports 45 and 46 are located so as to both register or communicate with outlet-to-exhaust channel 23', with the valve in the position of Fig. 2.

The valve housing 11 is provided with passages for providing communication between the annular channels therein and pressure line connections thereto, top and bottom inlet passages 48 being provided communicating with inlet channel 21, either one of which is connected with a pressure line 49, and top and bottom exhaust passages 50 being provided communicating with exhaust channel 21', either one of which is connected with an exhaust line 51.

Likewise, the valve housing 11 is provided with top and bottom outlet passages 52 which preferably communicate with cross passage 22c, either one of said passages being connected to a pressure line 53; and with top and bottom outlet passages 54 which preferably communicate with cross passage 23c, either one of said passages being connected to a pressure line 55. Since cross passage 22c communicates with channels 22 and 22', and cross passage 23c communicates with channels 23 and 23', the outlet passages could be made to communicate with the respective channels instead of the cross passages connecting the same, if desired.

Means for manually moving the plungers 17 and 18 in unison in the valve housing 11, may include an operating handle 58 having a yoke at its inner end comprising two arms 59 and 60 pivotally connected to the plungers 17 and 18 respectively. The end of arm 59 is pivoted to the reduced end portion 62 of plunger 17, and the end of arm 60 is pivoted to the reduced end portion of plug 42 in plunger 18, by pivot pin 61.

The yoke arms straddle a link 63 and are pivoted thereto by pin 64, one end of said link 63 being provided with an arcuate slot 65 slidably receiving pin 61, and the other end being pivoted by pin 66 to a bracket 67 on the valve body.

Thus, as the handle 58 is moved about the pin 64 to operate the valve, the link 63 pivots about pin 66 to maintain pin 61 in axial alignment with plungers 17 and 18, the ends of arcuate slot 65 limiting the movement of the handle in each direction.

Figure 1:
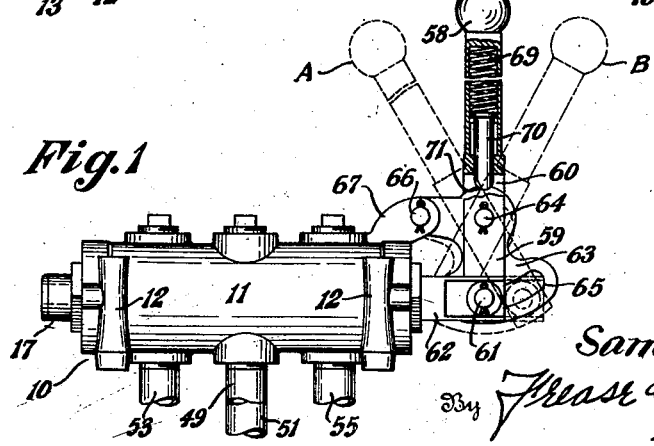
Figure 1 is a side elevation on a reduced scale of a preferred embodiment of a four way valve constructed according to the present invention.

The handle 58 is preferably tubular and has mounted therein a helical spring 69 which urges the plunger 70 against the edge of link member 63, and the link member 63 has a circular notch 71 thereon for receiving the rounded end of plunger 70 to yieldingly hold the handle in neutral position as shown in full lines in Fig. 1.

In the operation of the improved four way valve, assuming that an outlet passage 52 is connected by pipe line 53 to one side of a double acting operating cylinder, and that an outlet passage 54 is connected by pipe line 55 with the other side of the cylinder, the valve is shown in Fig. 2 in the neutral position to hold the piston in the cylinder against movement in either direction.

In this position, the incoming pressure through line 49 and inlet passage 48 is trapped in inlet channel 21, because the ports 38 and 39 are located between packings 26 and 27. Likewise, the pressure fluid in lines 53 and 55 is trapped in the valve housing, because pressure fluid in line 53 can pass through cross passage 22c but is trapped in annular channels 22 and 22', the ports 43 and 44 in plunger 18 being located between packings 25' and 26'; and the pressure fluid in line 55 passing through cross passage 23c is trapped in annular channels 23 and 23', the ports 45 and 46 of plunger 18 being located between packings 27' and 28'.

Figure 3:
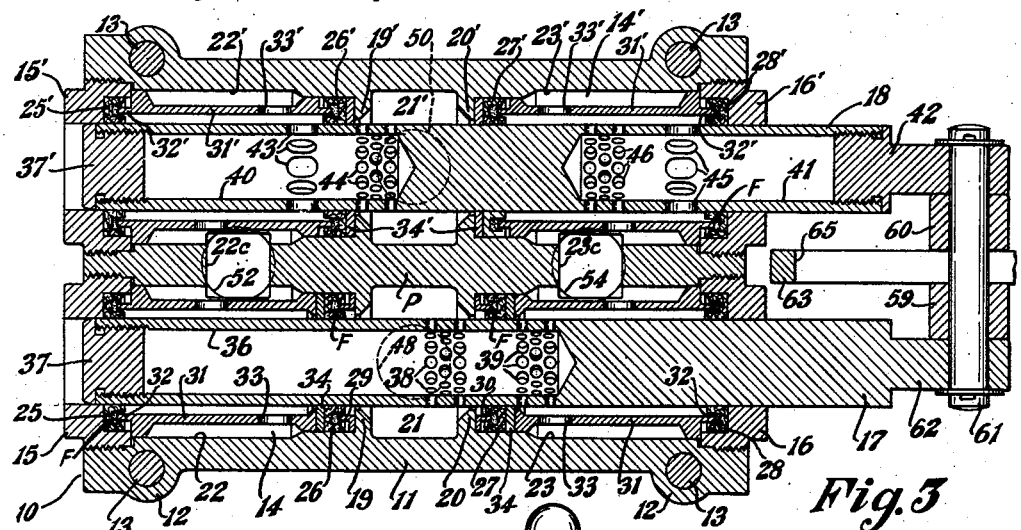
Fig. 3 is a longitudinal sectional view thereof showing the valve in "on" position for one line, and in "exhausting" position for the other line.

If handle 58 is moved to the dotted position A, the plungers 17 and 18 will assume the positions shown in Fig. 3. In this position, the incoming pressure passes from line 49 through inlet passage 48 into inlet channel 21, and from inlet channel 21 through ports 38 into the bore 36 of plunger 17, and thence through ports 39 into the inlet-to-outlet channel 23. From channel 23 the pressure fluid passes into cross passage 23c, outlet passage 54, and then through pipe line 55 to the pressure side of the operating cylinder. The pressure fluid in cross passage 23c communicates with channel 23' but since ports 45 and 46 are still located between packings 27' and 28', the pressure fluid is trapped in channel 23'.

At the same time, the pressure in line 53 connected with the exhaust side of the cylinder passes through outlet passage 52 and cross passage 22c into the outlet-to-exhaust channel 22', then into bore 40 of plunger 18 through ports 43, then through ports 44 into exhaust channel 21' and thence through exhaust passage 50 into exhaust line 51. The pressure fluid passing through cross passage 22c communicates with channel 22 but is trapped therein.

Thus in the position of Fig. 3, the pressure fluid from inlet line 49 communicates with the pressure side of the operating cylinder and the pressure fluid in line 53 from the exhaust side of the operating cylinder communicates with the exhaust line 51. If the operating handle is reversed to the dot-dash position B, the flow through the valve is reversed, the incoming pressure fluid passing through inlet-to-outlet passage 22 and line 53 to the other end of the operating cylinder, and at the same time the line 55 connected with the opposite end of the cylinder communicates through outlet-to-exhaust channel 23' with the exhaust line 51.

During the operation of the piston in the operating cylinder in either direction, the piston can be held in any desired position by moving the valve handle 58 to the neutral position shown in full lines in Fig. 1, in which the plungers 17 and 18 are in the position of Fig. 2, so that no pressure can flow through the valve to or from either line 53 or 55.

Moreover, the plungers 17 and 18 are always balanced in any and all positions of the valve, because the areas of the plungers subject to pressure tending to move the plungers in either direction are equal. Consequently, the valve will stay in any position it is put.

The packings 26 and 27 have their open sides directed toward inlet channel 21 so that in all positions of the valve the pressure fluid acts to spread apart the lips of the packings to seal them between the plunger 17 and the valve body. The hardened steel rings 34 serve to take the wearing or scoring action which would otherwise fall on the packings 26 and 27, which action occurs as the ports 38 or 39 pass over the packings and accelerate the velocity of the fluid passing through the ports as they are throttled.

For example, as plunger 17 moves from the position of Fig. 3 to the position of Fig. 2, the ports 39 are first closed or throttled by steel ring 34 so that the scoring action resulting from the accelerated velocity of the pressure fluid passing through ports 39 from channel 21 is taken by the hardened steel ring 34 instead of packing ring 27.

Similarly, hardened steel rings 34' serve to take the wearing action which would otherwise fall on packings 26' and 27' as the ports 44 and 46 respectively pass thereover.

Moreover, the pressure on the packing rings is always balanced at the time when the ports are passing thereover. For instance, as the ports 39 pass over the packing ring 27 the pressure from inlet channel 21 has access to the outer side of the inner lip of the packing ring past rib 20 and the pressure from bore 36 has access to the inner side of the inner lip of the packing ring through ports 39 as they pass thereover. Accordingly, there is no pressure tendency to disturb the packing ring as the ports 39 pass over the same, due to the balanced pressure on the packing ring.

The improved four way valve shown in Figs. 1 to 6 inclusive can be quickly and easily disassembled by disconnecting the link 63 from pivot pin 66, whereupon plungers 17 and 18 may be withdrawn from the valve housing. By then removing annular closure members 16 and 16' access is given to the packings and spacers in channels 23 and 23' for repair or replacement. By removing closure members 15 and 15' from the other end of the valve housing, access is had to the packing rings and spacers in channels 22 and 22'.

An improved three way valve constructed according to the present invention is shown at 110 in Fig. 7. Such a valve is adapted for use in connection with a single acting operating cylinder, for example, and accordingly has but one set of outlet passages 154 for connection to a pipe line leading to the operating cylinder.

Plungers 117 and 118 are slidably mounted in the valve housing 111, and manually operated by a handle 158 in the same manner as valve 10. An inlet passage 148 communicates with the inlet channel 121, and an exhaust passage 150 communicates with the exhaust channel 121'. The cross passage 123c in the partition wall P', which communicates with outlet passage 154, connects the inlet-to-outlet channel 123 with the outlet-to-exhaust channel 123'. When the valve is in the neutral holding position shown in Fig. 7, the incoming pressure is trapped in channel 121 because the ports 138 and 139 of plunger 117 are located between the packings in channel 121. Likewise the pressure fluid in the line connected to outlet passage 154 is trapped in channel 123 and channel 123'.

When the plungers 117 and 118 are moved by the valve handle 158 to the right as viewed at Fig. 7, the plungers assume the dot-dash positions indicated and ports 139 of plunger 117 communicate with channel 123, while the ports 145 and 146 of plunger 118 remain between the packings of channel 123'. Accordingly, the incoming pressure fluid passes from inlet channel 121 through ports 138 and 139, channel 123 and outlet passage 154 to the operating cylinder.

When the valve handle is reversed, the incoming pressure fluid is again trapped in inlet channel 121, but the pressure fluid in the line connected to outlet passage 154 passes through outlet-to-exhaust channel 123' to exhaust channel 121' and out through the exhaust passage 150.

When it is desired to hold the piston of the operating cylinder in any desired intermediate position, the same may be accomplished by moving the handle 158 to the neutral holding position shown in Fig. 7.

Figure 8:
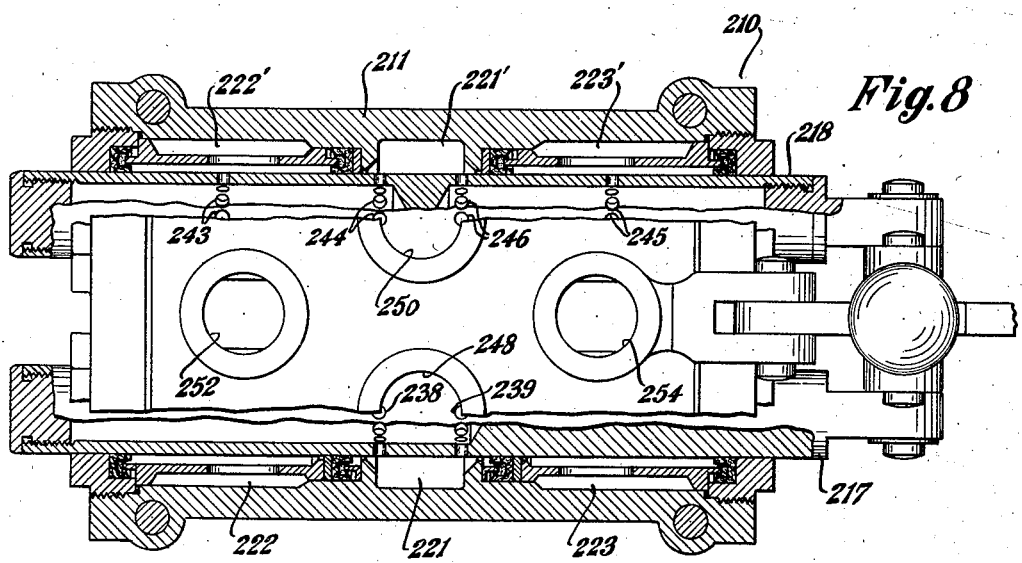
Fig. 8 is a longitudinal sectional view, partly in elevation, of a preferred embodiment of a slightly modified type of four way valve, showing the valve in neutral double exhausting position.
Figure 9:
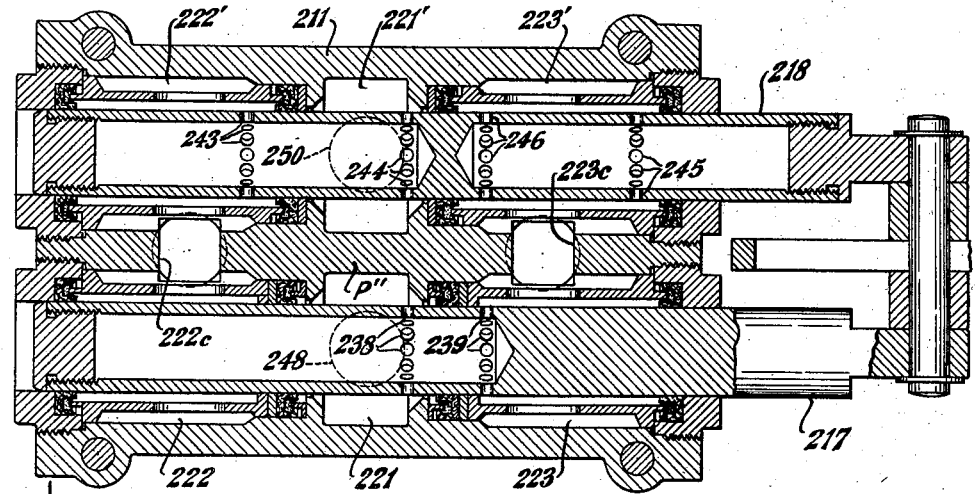
Fig. 9 is a longitudinal sectional view of the valve of Fig. 8 showing the valve in "on" position for one line and in "exhausting" position for the other line.

A slightly modified form of the four way valve embodiment is shown at 210 in Figs. 8 and 9, and this valve may be termed a compound exhaust valve to be utilized in a case where it is necessary to be able to relieve both ends of the operating cylinder of any pressure.

The valve housing 211 has an inlet channel 221, exhaust channel 221' inlet-to-outlet channels 222 and 223, and outlet-to-exhaust channels 222' and 223', all generally similar to the corresponding parts of the four way valve of Fig. 6. The same is true of the packing rings, spacers and hardened steel wearing rings which are located in channels 222, 222', 223, and 223'.

The plunger 217 is substantially the same as plunger 17 and has the ports 238 and 239 located in the same relative position as ports 38 and 39. The plunger 218 is generally similar to the plunger 18 except that the ports 243 and 244 are differently spaced from each other than the ports 43 and 44, and the same is true of ports 245 and 246 with relation to ports 45 and 46.

A cross passage 222c is provided in the partition wall P'' of the valve housing 211 communicating with channels 222 and 222', and a cross passage 223c is provided in the partition communicating with channels 223 and 223'. As best shown in Fig. 8, an inlet passage 248 in the valve housing communicates with inlet channel 221, and an exhaust passage 250 communicates with exhaust channel 221'.

Also, an outlet passage 252 communicates with cross passage 222c, and an outlet passage 254 communicates with cross passage 223c.

In the operation of the compound exhaust valve 210, assuming that outlet passages 252 and 254 are connected with the ends of an operating cylinder, when the valve is moved to the position of Fig. 9, the incoming pressure fluid passes into inlet channel 221, through inlet-to-outlet channel 223 and out through outlet passage 254 to the pressure side of the operating cylinder. In that position, the pressure fluid in the line connecting the exhaust side of the operating cylinder to the outlet passage 252, flows through outlet-to-exhaust channel 222', ports 243 and 244 into exhaust channel 221', and out of exhaust passage 250. When the position of the valve is reversed, the incoming pressure fluid flows through outlet passage 252 to the other side of the operating cylinder, and from the opposite end thereof to passage 254, through the valve body and out the exhaust passage 250.

When it is desired to relieve both ends of the operating cylinder of any pressure whatever, the valve is moved to the neutral position of Fig. 8, which in this case is a double exhausting position. In this position the operating piston cannot creep in either direction due to any slight amount of leakage which might occur in the valve or in the cylinder, because both sides of the piston are connected to the exhaust line.

In this double exhausting position, the pressure fluid in both lines connected to outlet passages 252 and 254 passes through cross passages 222c and 223c into channels 222' and 223' respectively. Due to the spacing of ports 243 and 244 and of ports 245 and 246, both channels 222' and 223' are connected to the exhaust channel 221' when the valve is in neutral position, as clearly shown in Fig. 8.

In all of the embodiments of the invention herein shown and described, the flexible packing rings under which the ports in the plungers pass are pressure sealed and the pressure is balanced on both sides of the packing rings as the valve is moved in either direction. Also the metal wearing rings in all embodiments function to take the wearing action at the packing rings under which the ports of the plungers move. In all embodiments the valve is quickly and easily dissembled for inspection and repair and is adapted to take the place of a more complicated valve, or of a plurality of valves in pressure flow systems.

In all embodiments, the present improved valve is simple and inexpensively made and operates with a minimum of leakage and wear over long periods of time.

We claim:—

1. In fluid pressure valve construction, a valve housing having laterally spaced open-ended tubular bores extending therethrough and longitudinally spaced annular channels formed in each of said bores, a hollow cylindrical plunger member slidably mounted in and extending entirely through each bore, means for moving said plungers in unison in the same direction in said bores, walls forming a cross passage providing communication between two laterally opposite annular channels, said valve housing having an inlet passage communicating with another of said annular channels and an exhaust passage communicating with a laterally opposite channel, walls forming an outlet passage communicating with said cross passage, and said plunger members having longitudinally spaced ports through their tubular walls for providing communication between longitudinally spaced annular channels.

2. In fluid pressure valve construction, a valve housing having spaced longitudinal bores formed and extending entirely therethrough therein, a hollow cylindrical plunger member closed at both ends slidably mounted in and extending entirely through each bore, said valve housing having longitudinally spaced annular channels formed therein around each plunger member, walls forming a cross passage providing communication between two opposite annular channels, channel-shaped pressure sealed packing rings in each of said opposite annular channels, walls forming an inlet passage communicating with another of said annular channels around one of said plunger members, an exhaust passage communicating with an opposite annular channel around the other plunger member, and an outlet passage communicating with said cross passage, and each of said plungers having longitudinally spaced ports through their tubular walls for providing communication between the longitudinally spaced annular channels surrounding said plunger.

3. In pressure fluid valve construction, a valve housing having laterally spaced tubular bores extending therethrough, hollow cylindrical plunger members closed at both ends journalled one in each of said bores and extending entirely therethrough, walls forming an annular inlet channel and a longitudinally spaced annular outlet channel in the valve housing around one plunger member, walls forming an annular exhaust channel and a longitudinally spaced outlet channel in the valve body around the other plunger member, walls forming a cross passage in the valve housing providing communication between said annular outlet channels, means for moving the plunger members in unison, the first plunger having longitudinally spaced ports through its tubular walls for providing communication between the inlet and outlet channels surrounding said plunger, the second plunger having longitudinally spaced ports through its tubular walls for providing communication between the outlet and exhaust channels surrounding said plunger, and the ports of the first plunger being located within the inlet channel when the valve is in neutral position.

4. In pressure fluid valve construction, a valve housing having longitudinally spaced tubular bores extending therethrough, hollow plunger members closed at both ends journalled one in each of said bores, walls forming an annular inlet channel and a longitudinally spaced outlet channel in the valve housing around one plunger member, walls forming an annular exhaust channel and a longitudinally spaced outlet channel in the valve housing around the other plunger member, walls forming a cross passage in the valve housing providing communication between said annular outlet channels, means for moving the plunger members in unison, the first plunger having longitudinally spaced ports through its tubular walls for providing communication between the inlet and outlet channels surrounding said plunger, the second plunger having longitudinally spaced ports in its tubular walls for providing communication between the outlet and exhaust channels surrounding said plunger, and the ports of the second plunger being located within the outlet channel when the ports of the first plunger are in position providing communication between the inlet and outlet channels surrounding the first plunger.

5. In pressure fluid valve construction, a valve housing having longitudinally spaced tubular bores extending therethrough, hollow plunger members closed at both ends journalled one in each of said bores, walls forming an annular inlet channel and a longitudinally spaced outlet channel in the valve housing around one plunger member, walls forming an annular exhaust channel and a longitudinally spaced outlet channel in the valve housing around the other plunger member, walls forming a cross passage in the valve housing providing communication between said annular outlet channels, means for moving the plunger members in unison, the first plunger having longitudinally spaced ports through its tubular walls for providing communication between the inlet and outlet channels surrounding said plunger, the second plunger having longitudinally spaced ports in its tubular walls for providing communication between the outlet and exhaust channels surrounding said plunger, and the ports of the second plunger being adapted to be located within the outlet channel when the ports of the first plunger are within the inlet channel or are in position providing communication between the inlet and outlet channels surrounding the first plunger.

6. In pressure fluid valve construction, a valve housing having longitudinally spaced tubular bores extending therethrough, hollow plunger members closed at both ends journalled one in each of said bores, walls forming an annular inlet channel and a longitudinally spaced outlet channel in the valve housing around one plunger member, walls forming an annular exhaust channel and a longitudinally spaced outlet channel in the valve housing around the other plunger member, walls forming a cross passage in the valve housing providing communication between said annular outlet channels, means for moving the plunger members in unison, the first plunger having longitudinally spaced ports through its tubular walls for providing communication between the inlet and outlet channels surrounding said plunger, the second plunger having longitudinally spaced ports in its tubular walls for providing communication between the outlet and exhaust channels surrounding said plunger, and the ports of the first plunger being located within the inlet channel when the ports of the second plunger are within the outlet channel or are in position providing communication between the outlet and exhaust channels surrounding the second plunger.

7. In pressure fluid valve construction, a valve housing having laterally spaced tubular bores extending therethrough, hollow plunger members closed at both ends journalled one in each of said bores, walls forming an annular inlet channel and an annular outlet channel at each end thereof in the valve housing around one plunger member, walls forming an annular exhaust channel and an annular outlet channel at each end thereof in the valve housing around the other plunger member, walls forming a cross passage in the valve housing providing communication between opposite annular outlet channels, means for moving the plunger members in unison in the same direction, the first plunger member having longitudinally spaced ports through its tubular walls for providing communication between the inlet and the outlet channels surrounding said plunger, the second plunger having two sets of longitudinally spaced ports through its tubular walls for providing communication between the exhaust and the outlet channels surrounding said plunger, and the ports of the first plunger being located within the inlet channel when the valve is in neutral position.

8. In pressure fluid valve construction, a valve housing having laterally spaced tubular bores extending therethrough, hollow plunger members closed at both ends journalled one in each of said bores, walls forming an annular inlet channel and an annular outlet channel at each end thereof in the valve housing around one plunger member, walls forming an annular exhaust channel and an annular outlet channel at each end thereof in the valve housing around the other plunger member, walls forming a cross passage in the valve housing providing communication between opposite annular outlet channels, means for moving the plunger members in unison, the first plunger member having longitudinally spaced ports through its tubular walls for providing communication between the inlet and the outlet channels surrounding said plunger, the second plunger having two sets of longitudinally spaced ports through its tubular walls for providing communication between the exhaust and the outlet channels surrounding said plunger, one set of ports of the second plunger being located within one outlet channel and the other set of ports providing communication between the other outlet channel around said second plunger and the exhaust channel when the ports of the first plunger are in position providing communication between the inlet and the outlet channel surrounding said first plunger and opposite said one outlet channel.

9. In pressure fluid valve construction, a valve housing having laterally spaced tubular bores extending therethrough, hollow plunger members closed at both ends journalled one in each of said bores, walls forming an annular inlet channel and an annular outlet channel at each end thereof in the valve housing around one plunger member, walls forming an annular exhaust channel and an annular outlet channel at each end thereof in the valve housing around the other plunger member, walls forming a cross passage in the valve housing providing communication between opposite annular outlet channels, means for moving the plunger members in unison, the first plunger member having longitudinally spaced ports through its tubular walls for providing communication between the inlet and the outlet channels surrounding said plunger, the second plunger having two sets of longitudinally spaced ports through its tubular walls for providing communication between the exhaust and the outlet channels surrounding said plunger, each set of ports of the second plunger being located within an outlet channel surrounding said plunger when the ports of the first plunger are within the inlet channel surrounding the first plunger.

10. In pressure fluid valve construction, a valve housing having laterally spaced tubular bores extending therethrough, hollow plunger members closed at both ends journalled one in each of said bores, walls forming an annular inlet channel and an annular outlet channel at each end thereof in the valve housing around one plunger member, walls forming an annular exhaust channel and an annular outlet channel at each end thereof in the valve housing around the other plunger member, walls forming a cross passage in the valve housing providing communication between opposite annular outlet channels, means for moving the plunger members in unison, the first plunger member having longitudinally spaced ports through its tubular walls for providing communication between the inlet and the outlet channels surrounding said plunger, the second plunger having two sets of longitudinally spaced ports through its tubular walls for providing communication between the exhaust and the outlet channels surrounding said plunger, one set of ports of the second plunger being located within one outlet channel and the other set of ports providing communication between the other outlet channel around said second plunger and the exhaust channel when the ports of the first plunger are in position providing communication between the inlet and the outlet channel surrounding said first plunger and opposite said one outlet channel, and each set of ports of the second plunger being located within an outlet channel surrounding said plunger when the ports of the first plunger are within the inlet channel surrounding the first plunger.

11. In pressure fluid valve construction, a valve housing having laterally spaced tubular bores extending therethrough, hollow plunger members closed at both ends journalled one in each of said bores, walls forming an annular inlet channel and an annular outlet channel at each end thereof in the valve housing around one plunger member, walls forming an annular exhaust channel and an annular outlet channel at each end thereof in the valve housing around the other plunger member, walls forming a cross passage in the valve housing providing communication between opposite annular outlet channels, means for moving the plunger members in unison, the first plunger member having longitudinally spaced ports through its tubular walls for providing communication between the inlet and the outlet channels surrounding said plunger, the second plunger having two sets of longitudinally spaced ports through its tubular walls for providing communication between the exhaust and the outlet channels surrounding said plunger, each set of ports of the second plunger providing communication between an outlet channel and the exhaust channel when the ports of the first plunger are within the inlet channel surrounding said plunger.

12. In fluid pressure valve construction, a tubular valve housing, two hollow plunger members slidably mounted side by side in said valve housing in spaced relation, said valve housing having longitudinally spaced annular inlet and outlet channels around one plunger member and outlet and exhaust channels around the other plunger member, walls forming a cross passage providing communication between opposite outlet channels, a channel-shaped pressure sealed packing ring around each plunger member between the longitudinally spaced channels surrounding the same, said plunger members having ports through their tubular walls for passing across said packing rings, said one plunger member having ports always communicating with said inlet channel, and said other plunger member having ports always communicating with the outlet channel surrounding said other plunger member.

13. In fluid pressure valve construction, a tubular valve housing, two hollow plunger members slidably mounted side by side in said valve housing in spaced relation, said valve housing having longitudinally spaced annular inlet and outlet channels around one plunger member and outlet and exhaust channels around the other plunger member, walls forming a cross passage providing communication between opposite outlet channels, a channel-shaped pressure sealed packing ring around said one plunger member between the inlet and outlet channels surrounding the same and having its open side always communicating with said inlet channel, a channel-shaped pressure sealed packing ring around said other plunger member between the outlet and exhaust channels surrounding the same and having its open side always communicating with said outlet channel, said plunger members having ports through their tubular walls for passing across said packing rings, said one plunger member having ports always communicating with said inlet channel, and said other plunger member having ports always communicating with the outlet channel surrounding said other plunger member.

NATHAN C. HUNT.
SAMUEL C. CHESSMAN.